(12) United States Patent
Hoek

(10) Patent No.: US 7,585,000 B1
(45) Date of Patent: Sep. 8, 2009

(54) LIQUID CHEMICAL APPLICATOR TANK

(75) Inventor: Trent J. Hoek, Mountain Lake, MN (US)

(73) Assignee: Fast Distributing, Inc., Mountain Lake, MN (US)

( * ) Notice: Subject to any disclaimer, the term of this patent is extended or adjusted under 35 U.S.C. 154(b) by 283 days.

(21) Appl. No.: 11/830,313

(22) Filed: Jul. 30, 2007

(51) Int. Cl.
*B60P 3/22* (2006.01)

(52) U.S. Cl. ........................................ 280/837; 220/562

(58) Field of Classification Search ................ 280/831, 280/834, 836–838; 239/147, 172; 220/DIG. 24, 220/562–564
See application file for complete search history.

(56) References Cited

U.S. PATENT DOCUMENTS 1,886,197 A * 11/1932 Kramer ....................... 280/837
2,091,731 A * 8/1937 Gredell ....................... 220/564
2,362,657 A * 11/1944 Meyer ......................... 29/469.5
3,697,093 A * 10/1972 Cadiou ......................... 280/834
7,178,686 B2 * 2/2007 Bolzer et al. ............. 220/567.1

* cited by examiner

*Primary Examiner*—Christopher P Ellis
*Assistant Examiner*—Levon Fiore
(74) *Attorney, Agent, or Firm*—C. G. Mersereau; Nikolai & Mersereau, P.A.

(57) ABSTRACT

A liquid chemical applicator tank made out of ultrahigh modular weight polyethylene which has a higher volume tank by use of a tank design with a narrower front end and wider rear end over the wheels of the trailer. The tank has wheel wells over the wheels, and a series of weldments on the frame engage indented ribs in the tank to help support the tank over the wheels. The tank has a short length and width while having a large volume such that the width is less than twelve feet, eliminating special road permits, while hauling up to 2400 gallons with a 62½ inches on-center lateral length between the inside wheel assemblies. The short length and low profile allows better tracking and greater visibility. Indented ribs in the tank engage weldments on the trailer frame to eliminate straps to hold the tank on the trailer.

8 Claims, 19 Drawing Sheets

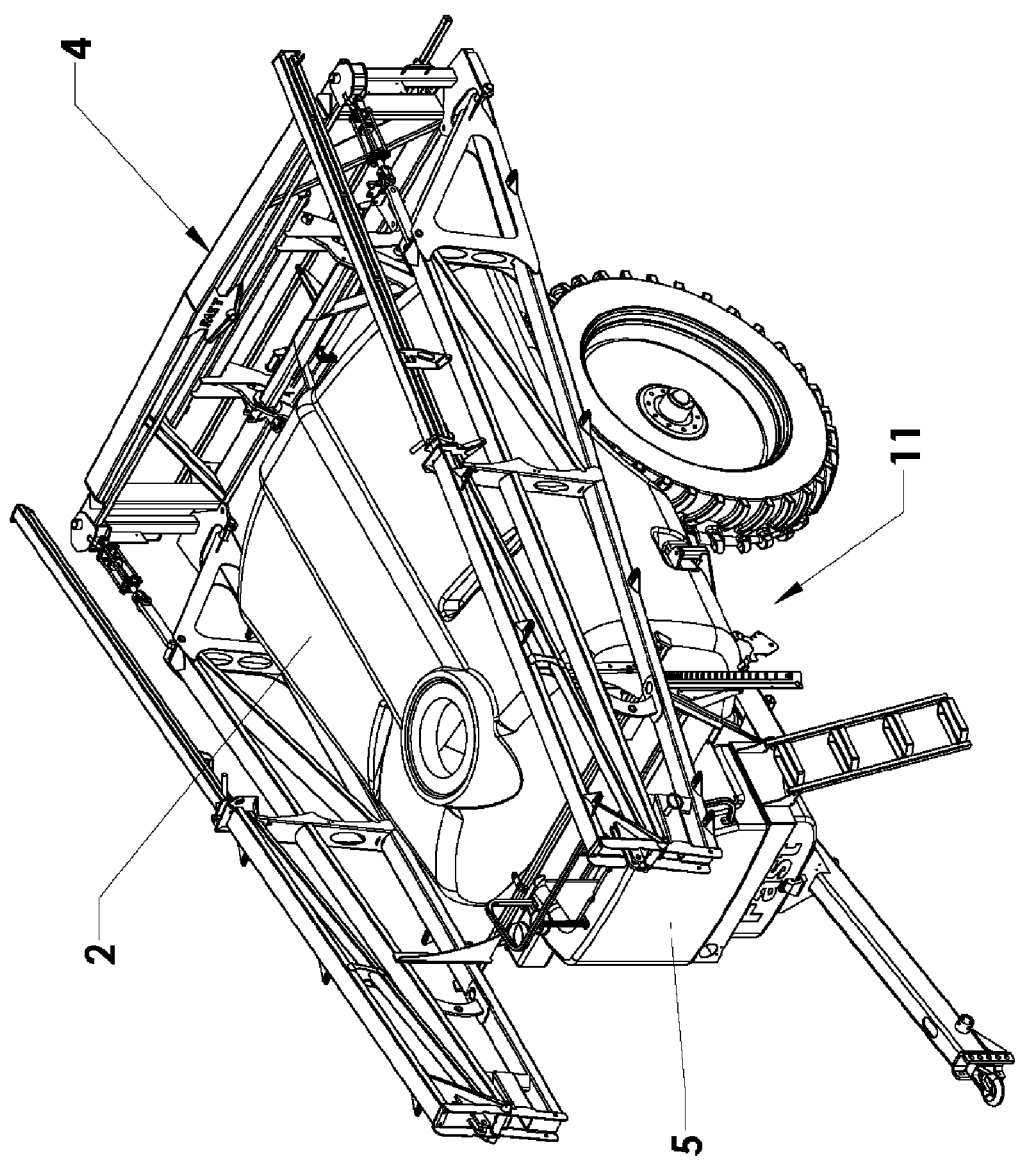

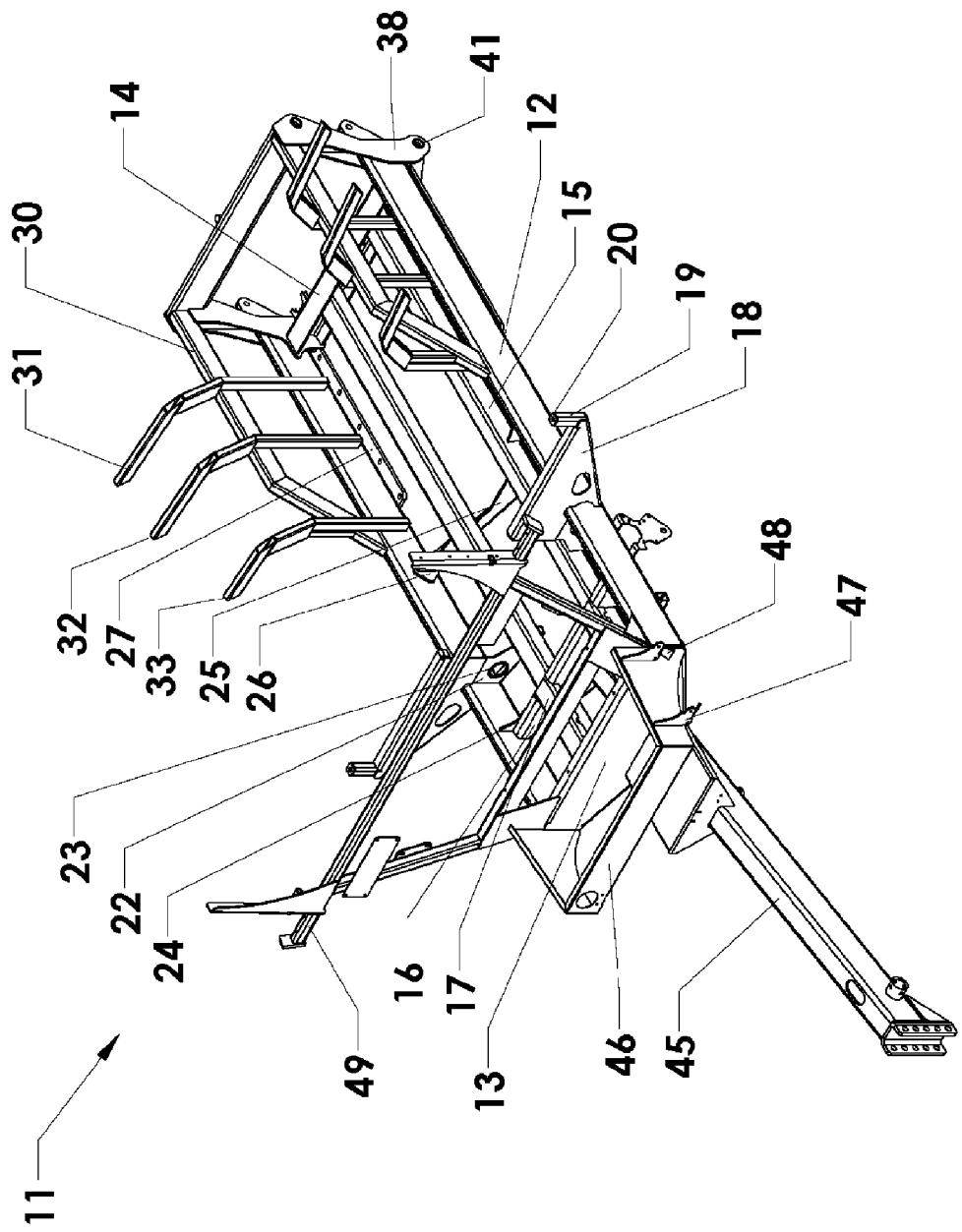

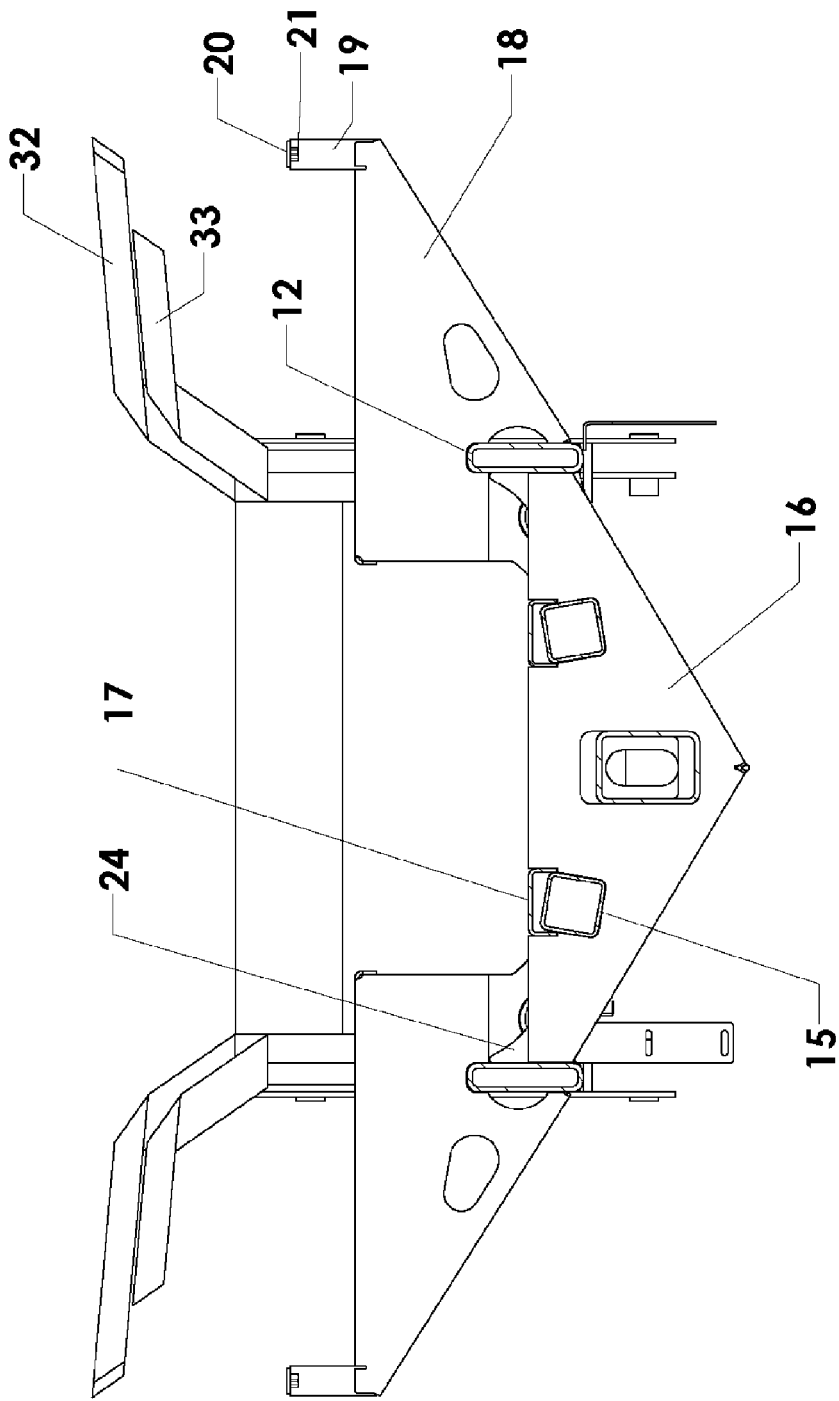

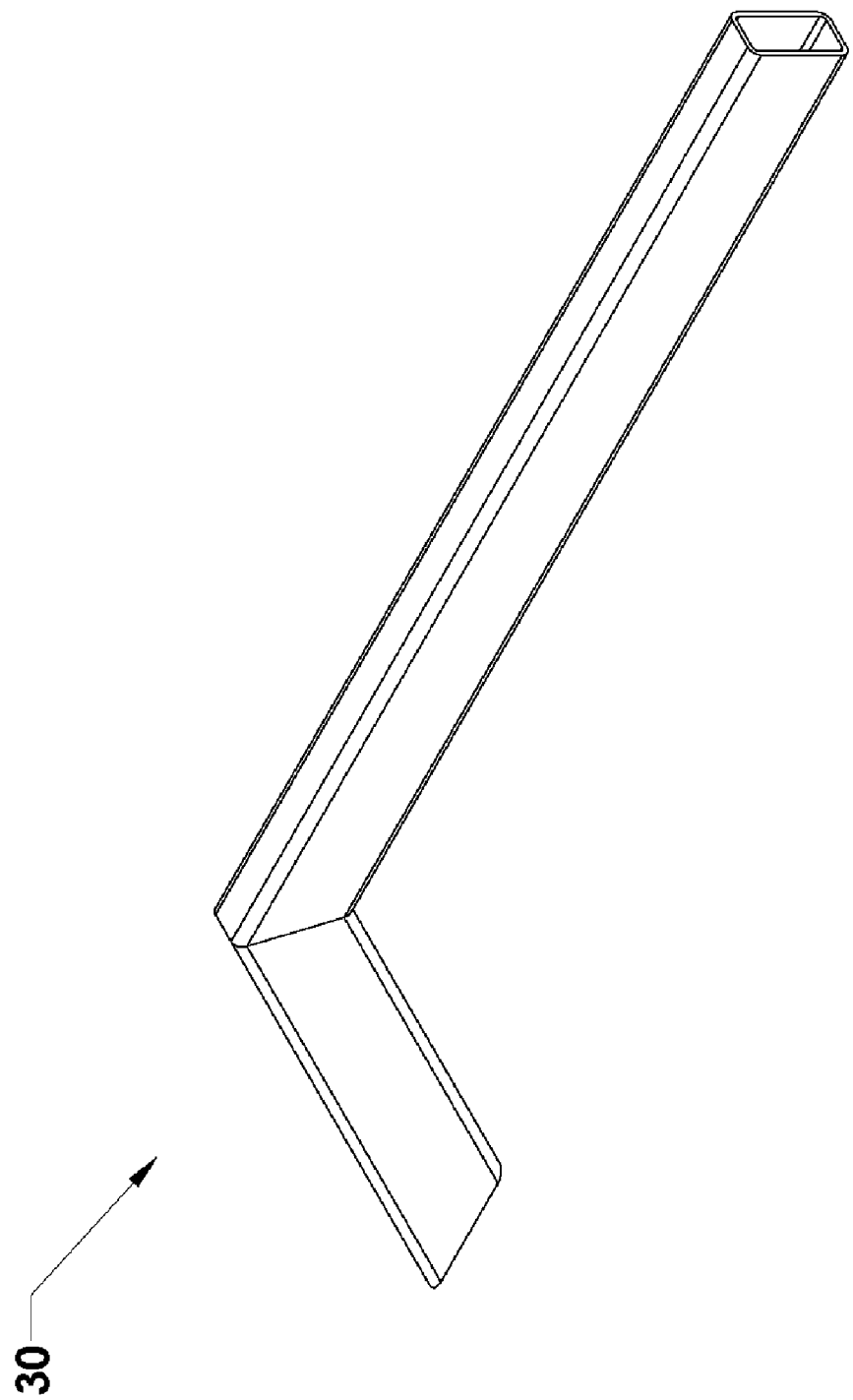

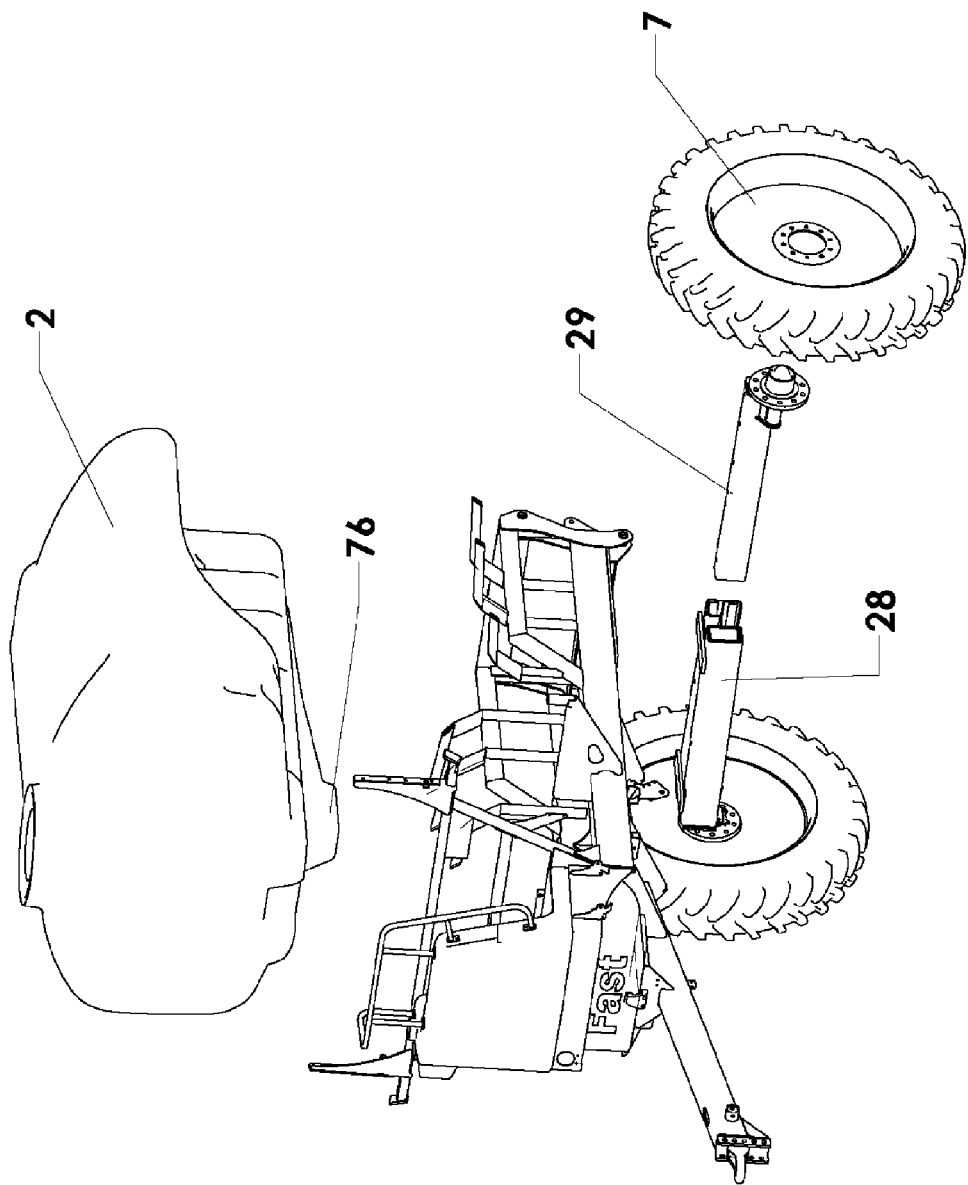

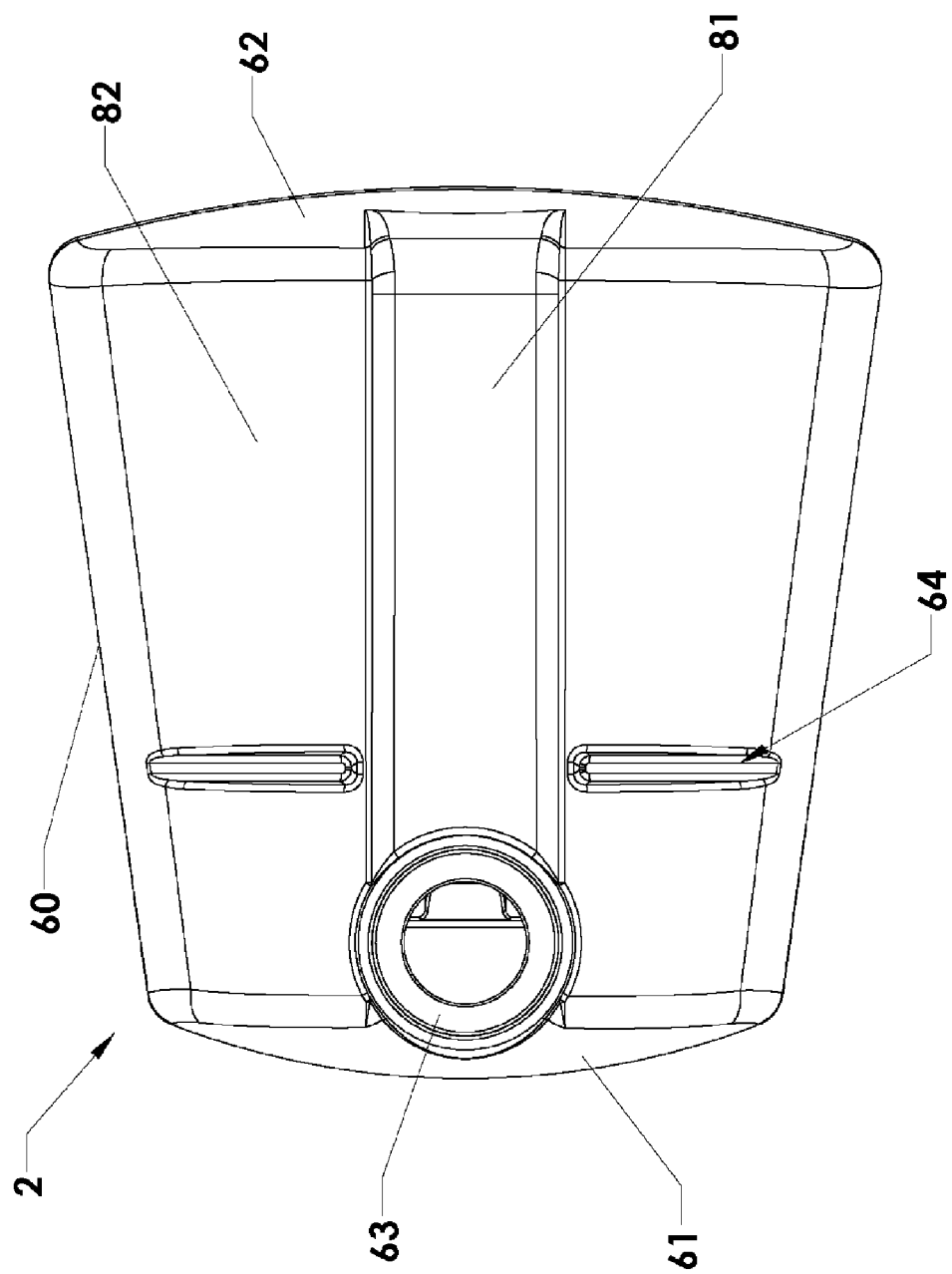

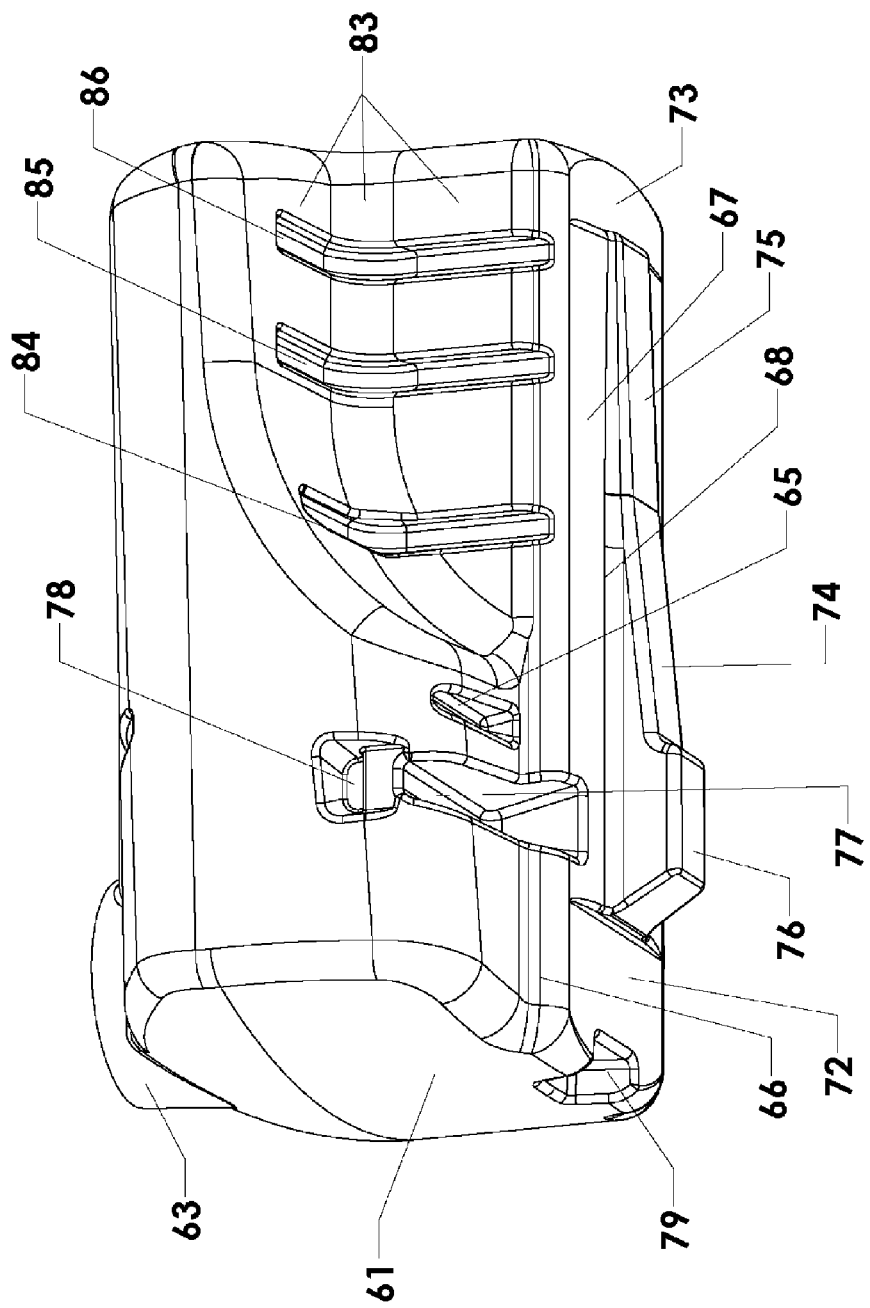

LIQUID CHEMICAL APPLICATOR TANK

BACKGROUND OF THE INVENTION

1. Field of the Invention

This invention relates to agricultural trailed equipment used in the application of liquid chemicals and more particularly to a plastic liquid chemical tank to increase the capacity of the applicator and, at the same time, maintain a short coupled low profile trailer for better tracking and visibility.

2. Description of the Prior Art

Agricultural trailed chemical application equipment generally consists of a rolling framework that supports a reservoir to carry liquid chemical product. The product contained in the reservoir is delivered to various locations along a boom mounted to the framework for accurately dispensing at a desired latitudinal distance from the centerline of the main trailer towing vehicle or tractor. The trailer is attached to the tractor through a load bearing pivot point at the rear of the tractor which allows the tractor-trailer combination to articulate for steering purposes.

The economy of chemical application is continuously improving by increasing the latitudinal distance, swath width, of the application equipment in an effort reduce the number of passes required for a given area of land. In addition to increasing the boom lengths, larger liquid chemical tank capacities are also desired to reduce the number of reloading operations that are required. As agricultural semi-trailed chemical application equipment has grown larger in size the accepted practice of increasing the liquid chemical tank's capacity is to retain a generally rectangular or elliptical profile and lengthen and/or raise the overall height of the tank. The lateral dimension of the tank is usually limited by Department of Transportation (D.O.T.) regulations which do not allow shipping or hauling of equipment more than twelve feet (3.66 meters) in overall width without special road permits. Lengthening the liquid chemical tank also in effect lengthens the trailer, thereby moving the rear mounted boom and axle arrangement back away from the towing vehicle. The axle assembly must move proportionally with the lengthened tank in order to maintain a proper balance of the trailer unit to the hitch point, thereby minimizing or eliminating the reverse gravitational hitch loads.

Increasing the distance between the tractor hitch pin and the trailer's axle, however, reduces the trailer's ability to effectively follow in the same wheel track as the towing vehicle. This off-tracking is a common characteristic of fixed axle semi-trailed equipment whenever the refraction angle at the hitch point deviates from an aligned position such as when turning or steering corrections are necessary. Wheel off-tracking is also exaggerated on trailing equipment when traversing a side slope where the gravitational force tends to pull or slide the trailer down the slope causing the trailer to yaw from an optimal path in which the center line of the trailer is aligned simultaneously with the centerline of the towing vehicle. Whether the result of side slopes or necessary navigating functions, whenever the trailer's wheel path deviates from the tractors wheel track, there is a substantial risk of increased crop damage and loss of overall yield.

Increasing the overall height of the tank to obtain more tank capacity greatly raises the center of gravity and obstructs rear view. Raising the center of gravity causes the trailer assembly to become less stable and more susceptible to roll over.

Typically a plastic liquid chemical tank is secured to the trailer framework by means of nylon straps or a formed steel members that circumnavigate the tank and bolt to the trailer frame work. As well as securing the tank to the trailer's framework the formed steel members, or "hoops", can also provide structural integrity to the plastic tank and help maintain the original rectangular or elliptical profile.

SUMMARY OF THE INVENTION

The wedge shaped profile of the invention's plastic liquid chemical tank provides a high volume configuration, from 1800 gallons to 2400 gallons, that more effectively uses the available space on an agricultural pull type sprayer. Effectively using space that would normally be void with other traditional tank profiles provides a means of maximizing the volumetric capacity while maintaining a relatively short length and low height tank profile. Minimizing the length of the liquid chemical tank allows the trailer to be short coupled to the towing vehicle and reduces the amount of off-tracking that may occur while turning corners or crossing side slopes. Furthermore an overall minimum height profile will increase the operator's rearward visibility while also reducing the tendency for the trailer to overturn on steep terrain.

In place of the commonly used straps or formed steel members to fasten the tank to the trailer, the invention's tank profile has recessed pockets molded into it that allows the tank to be secured to the trailer through a bolted UHMW tab. This tab and slot method greatly reduces both the material and labor cost associated with securing the tank to the trailer.

OBJECTS OF THE INVENTION

It is an object of the invention to enhance the tracking performance of the applicator trailer relative to the towing vehicle.

It is an object of the invention to minimize the distance from the towing vehicle to the axle or axles of the trailer.

It is an object of the invention to maximize the liquid chemical tank's volumetric capacity relative to the distance from the towing vehicle to the axle or axles of the trailing chemical applicator.

It is an object of the invention to maximize the liquid chemical tank's volumetric capacity relative the overall transport height, and width of the trailing chemical applicator.

It is an object of the invention to maximize rearward visibility relative to the volumetric capacity of the liquid chemical tank.

It is an object of the invention to provide a high capacity liquid chemical tank for trailing chemical applicators that will not exceed twelve feet (3.66 meters) in overall transport width.

It is an object of the invention to provide a trailing chemical applicator with a minimum 62½ inch (1.59 meters) on-center lateral dimension between the single wheel assemblies It is an object of the invention to provide a trailing chemical applicator with a dual wheel arrangement to accommodate 62½ inches on-center lateral dimension between the two inside wheel assemblies and 120 inches (3.05 meters) lateral on-center dimension between the two outside wheel assemblies.

It is the object of the invention to allow a 167 inch (4.24 meters) longitudinal distance between the center of the chemical applicator's wheel assembly and the center of the hitch point.

It is an object of the invention to maintain a positive load in the direction of gravitational force at the coupling connection between trailer and towing vehicle.

It is the object of the invention to provide a simple and effective means of securing a plastic tank to the trailer's metal framework without using hoops or straps.

It is the object of the invention to access the fill port of the chemical tank by means of the operator's platform with the wings folded in the transport position.

It is the object of the invention to have a liquid chemical tank capacity of more than 1800 gallons.

Other objects, advantages, and novel features of the present invention will become apparent from the following description of the preferred embodiments when considered in conjunction with the accompanying drawings and illustrations.

BRIEF DESCRIPTION OF THE DRAWINGS

FIG. 2 is a perspective view of the preferred embodiment of FIG. 1 with the booms folded in as in a transport position;

FIG. 4 is a perspective view of components that, in part, form the carrier frame assembly used with the configuration of FIG. 1;

FIG. 4A is a partial cross-sectional view of the carrier frame assembly illustrated in FIG. 4;

FIG. 4B is a detailed perspective view of the side wall brace used on the carrier frame illustrated in FIG. 4;

FIG. 5 is a partial exploded view of the preferred agricultural sprayer assembly shown illustrated in FIG. 1;

FIG. 6 is a top plan view of the invention's liquid chemical tank of FIG. 1;

FIG. 7 is a lower perspective view of the liquid chemical tank illustrated in FIG. 1;

DETAILED DESCRIPTION OF THE PREFERRED EMBODIMENT

Figure 1:
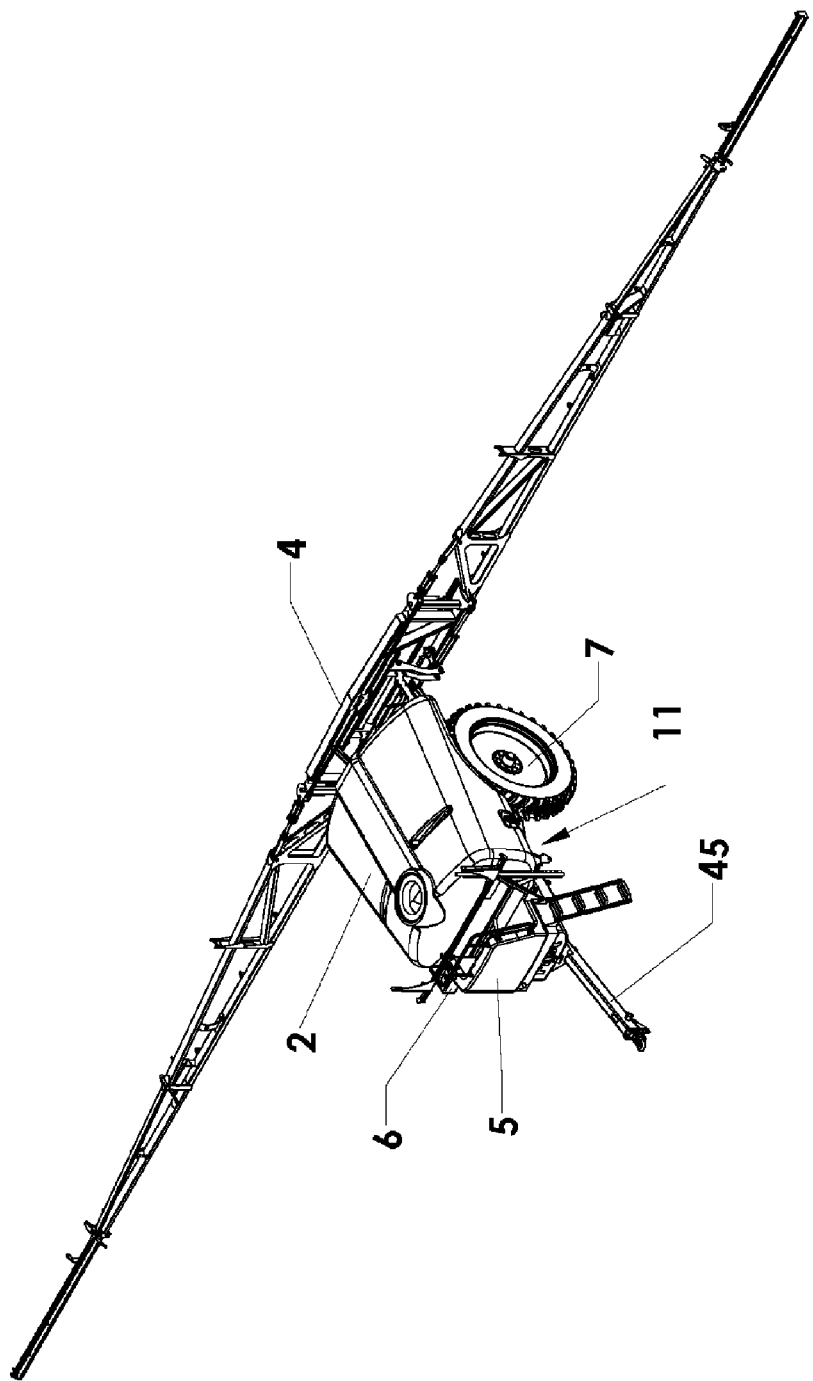
FIG. 1 is a perspective view of a preferred embodiment of an agricultural sprayer assembly constructed in accordance with the present invention with the booms unfolded in the field application position.

Chemical applicator trailers, or more specifically, agricultural trailer sprayer assemblies, made in accordance with the present invention all have various features in common. The first such feature shown in FIG. 1 is the carrier frame assembly 11. As its label implies, the carrier frame 11 is configured to facilitate the transporting or carrying of other sprayer assembly 1 components such as the chemical reservoir 2, clean rinse water reservoir 5, clean water hand/eye wash reservoir 6 and the chemical application boom 4. The carrier frame 11 is partially supported by a rolling assembly which may consist of but is not limited to a wheel or wheeled assemblies 7. The remaining resultant forces are typically supported by a rigid hitch assembly 45 that protrudes from the front of the carrier frame 11 and is connected to a tractor or other powered vehicle in a conventional manner. The chemical tank 2 stores a liquid mixture to be evenly applied to the ground or foliage through multiple distribution points located along the chemical application boom 4. Additionally FIG. 1 illustrates a clean water rinse tank reservoir 5 used to flush residual chemicals from the tank 2 or subsequent plumbing to the distribution nozzles along the application boom 4. A separate small volume hand/eye wash reservoir 6 is mounted to the carrier frame 11 and provides clean water for use as a limited personal wash station.

Those skilled in the art will immediately recognize that an agricultural sprayer must maintain a high clearance between the underside of the trailer assembly and the ground to maximize crop clearance. Furthermore it is advantageous to minimize the longitudinal distance between the towing vehicle's hitch point and the wheel assemblies 7 of the trailer sprayer to minimize off-tracking and prevent crop damage. For stability and visibility reasons it is also desirable to maintain a relatively low overall height profile.

The present invention generally resides in the liquid chemical tank's 2 shape, the manner in which it is supported by and secured to the carrier frame assembly 11, and more specifically how it allows for a balanced short coupled low profile trailer sprayer. For this reason, the prior, exemplary trailer sprayer assembly, application boom 4, rinse tank 5, and hand/eye wash reservoir 6 are described in minimal detail and hereinafter the liquid chemical tank 2 and carrier frame 11 will be described in greater detail.

Figure 2A:
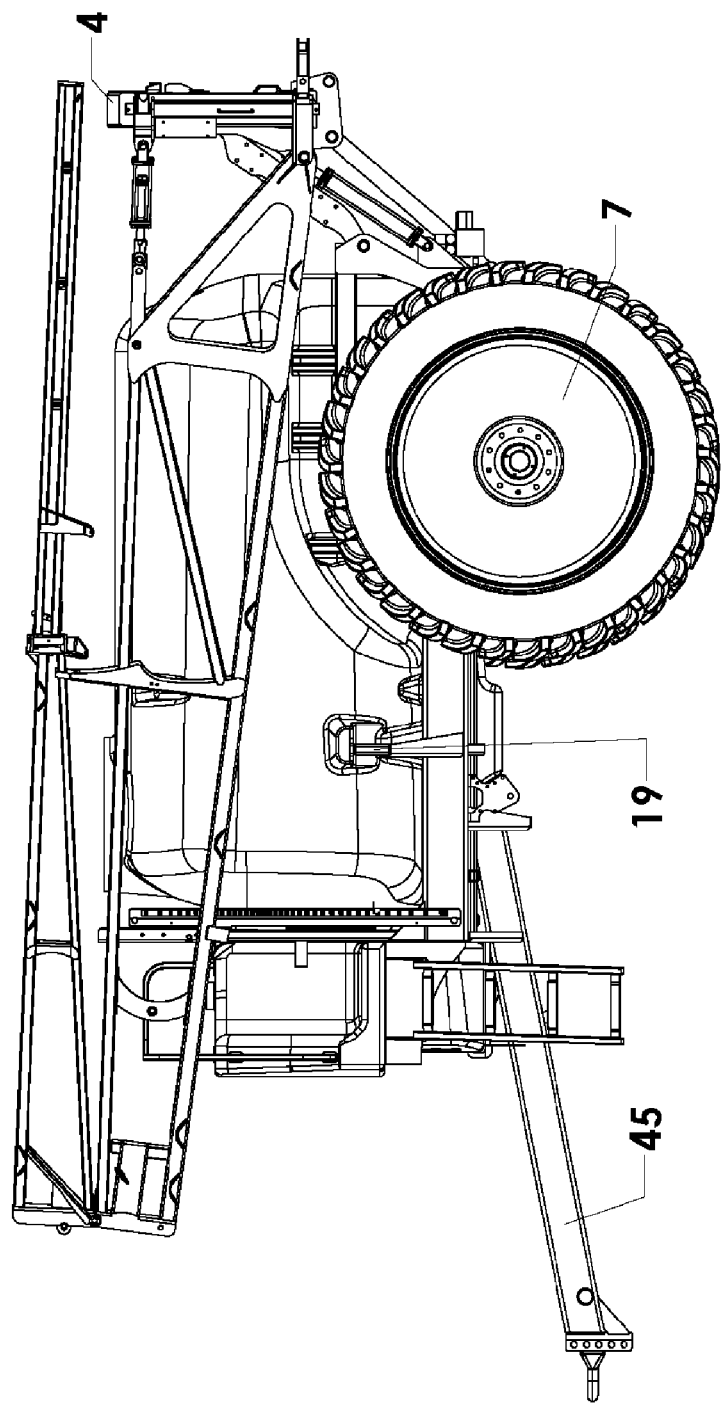
FIG. 2A is a side plan view of the agricultural sprayer assembly of FIG. 2 with the booms folded in as in a transport position.
Figure 2B:
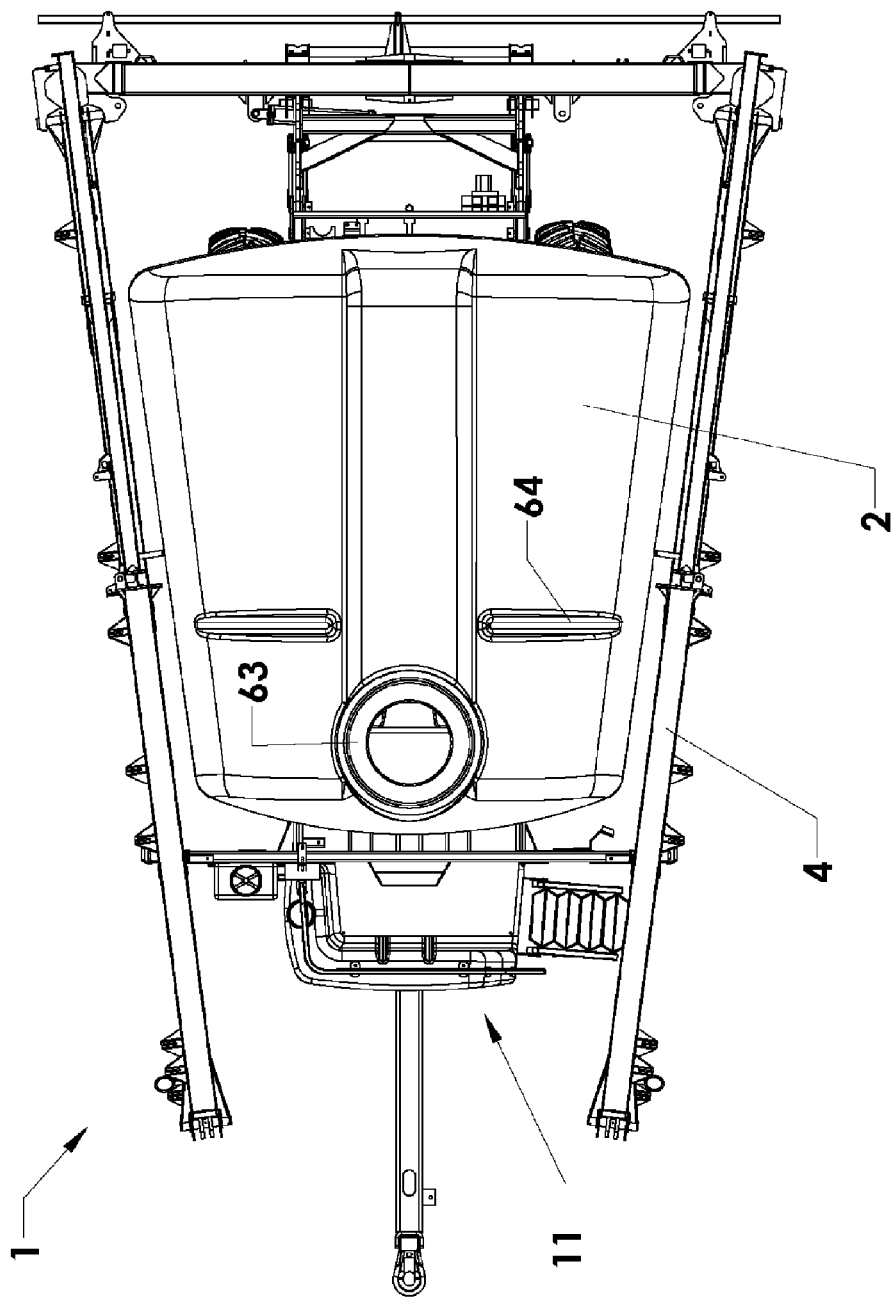
FIG. 2B is a top plan view of the agricultural sprayer assembly of FIG. 2 with the booms folded in as in a transport position

FIG. 2 and FIG. 2B illustrate the wedge shape design of the tank 2 relative to a top plan view and how the profile of the tank 2 is designed to fit into the available cavity created when the boom assembly 4 is folded forward into the transport position.

Figure 3:
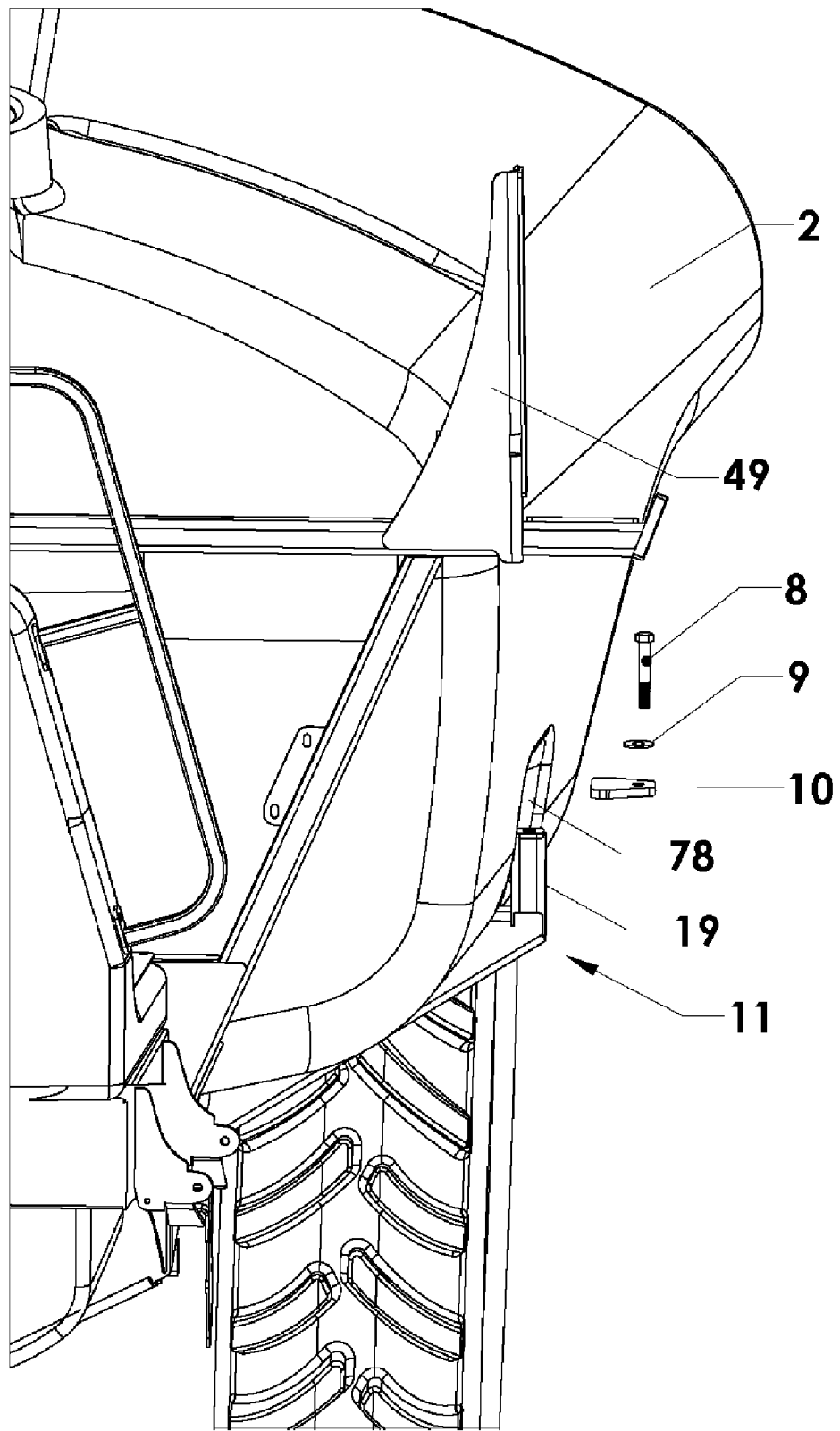
FIG. 3 is a partial exploded view illustrating the means by which the liquid chemical tank is secured to the trailer frame assembly.

Referring to FIG. 3, the method of securing the chemical reservoir 2 to the carrier frame 11 is via a UHMW hold down tab 10 in conjunction with a bolt 8 and washer 9 on each side of the agricultural trailer sprayer.

As shown in FIG. 4, the frame assembly 11 has various components located for attachment and support purposes relative to the overall function of the trailer sprayer as a whole. The function or purpose of each component associated to the invention should become clear as the carrier frame 11 and reservoir tank 2 are explained in further detail.

Among the many components shown on the carrier frame assembly 11 in FIG. 4, a hitch assembly 45 projects from the front of the frame and is the primary member for mounting the components which make up the exemplary hitch assembly for securing the trailer to the towing vehicle.

The primary boxed framework of the carrier frame 11 shown in FIG. 4, has two rectangular side tubes 12 that run longitudinally on the outside edge of the carrier frame 11 and are joined at each end by a front lateral cross member 13 and lower rear lateral cross member 14. Interior square tube members 15 run inside the boxed frame parallel to the rectangular side tubes 12 between the front cross member 13 and the lower rear cross member 14. As shown in the cross sectional view of FIG. 4A, this interior longitudinal square tube 15 is preferably tipped slightly relative to the face of the parallel rectangular side tube 12 to match the incline of the of the chemical reservoir's floor.

Referring to FIG. 4 and FIG. 4A, a formed intermediate cross member 16 ties the inside square tubes 15 to the outside rectangular tubing 12 and also provides a flat surface to support the floor of the liquid chemical tank 2 at this point. Because the formed intermediate cross member 16 supports a large portion of the liquid chemical tank's 2 overall loaded weight, a profile gusset 24 is used to reinforce the intermediate cross member's adhesion to the two longitudinal rectangular side tubes 12. Appropriately formed channel members 17 are positioned on the tipped interior square tubes 15 between the front cross member 13 and the formed intermediate cross member 16 to provide additional flat area to rest the floor of the tank 2 on. Formed tank stabilizer arms 18 are welded to the rectangular side tubes 12 and braced to the interior square tubes 15 via a flanged brace plate 22. The flanged brace plates 22 are made as two separate plates and terminated near the inside of the interior square tube members 15 to allow room for the liquid chemical tank's 2 sump trough to pass through thereby maintaining a high clearance underbody to maximize crop clearance. A hole is placed in the middle of the flanged brace plate 22 with a rolled rod 23 welded to the inside circumference for routing rubber hose through. The top flange of the formed tank stabilizer arm 18 is designed to rest against a matching recess in the liquid chemical tank. A vertical square tube 19 is secured to the outer edge of the formed tank stabilizer arm 18. A flat square plate 20 with a hole in the center caps the top of the vertical square tube 19.

Referring to FIG. 3 and FIG. 4A, a threaded hex nut 21 is welded to the inside of the flat square plate 20 and centered on the hole. This threaded nut 21 accepts the bolt 8 used to fasten the liquid chemical tank 2 to the carrier frame 11.

Referring back to FIG. 4 and FIG. 4a, the formed tank stabilizer arm 18, the vertical square tube 19, the flat square plate 20, and the threaded hex nut 21 form an assembly that stabilizes the tank both longitudinal and laterally as well as establishes the rigid frame components required to hold the tank down vertically.

Referring once again to FIG. 4, a second formed intermediate cross member 25 is positioned between the formed tank stabilizer arms 18 and the lower rear cross member 14. This second formed intermediate cross member 25 is used to tie together the longitudinal rectangular side tubes 12 and the tipped interior square tube members 15. As with the previously described front cross member 13, an irregular shaped plate gusset 26 must be placed at both ends of the second formed intermediate cross member 25 to help the welding adhesion to the longitudinal rectangular side tubes 12. The liquid chemical tank's 2 trough sump is relatively shallow at the location of the second formed intermediate cross member 25 and therefore allows the member 25 to entirely span across the carriers frame without jeopardizing ground clearance.

Referring still to FIG. 4 and FIG. 5, sliding axle plates 27 with five slotted holes are placed on the bottom side of the rectangular side tubes 12 near the rear portion of the carrier frame 11. These sliding axle plates 27 are used to bolt a receivable axle housing assembly 28 to the carrier frame 11 in three longitudinal positions at nine inch (22.9 centimeters) increments relative to the hitch point. The ability to vary the axle's longitudinal distance provides the flexibility to achieve the desired combination of trailer tracking and balance.

Referring to FIG. 4 and FIG. 4B, a sidewall brace weldment 30 is positioned on top of the longitudinal rectangular side tubes 12 and as its name implies, provides support for the straight sidewall surface of the liquid chemical tank 2 in this area.

Referring again to FIG. 4 and FIG. 4C, rear fender support weldments 31 are placed on top of the sidewall brace weldment 30 also extending down and welded to the longitudinal rectangular side tubes 12. The rear fender support weldment 31 extends out over the wheel assembly 7 cavity to support the portion of the tank that is positioned over the wheel assembly 7.

Figure 4C:
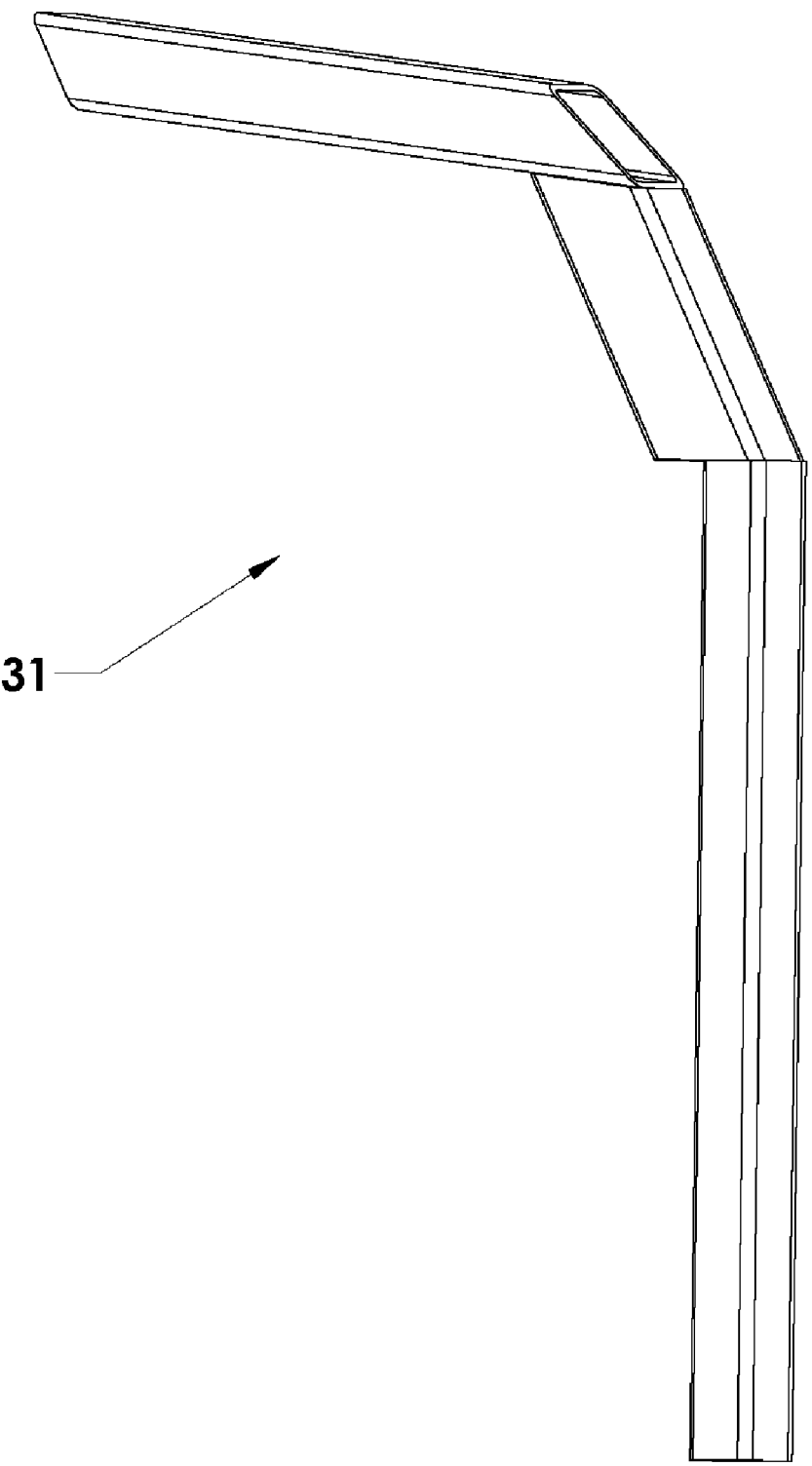
FIG. 4C is a detailed perspective view of the rear fender support used on the carrier frame illustrated in FIG. 4.
Figure 4D:
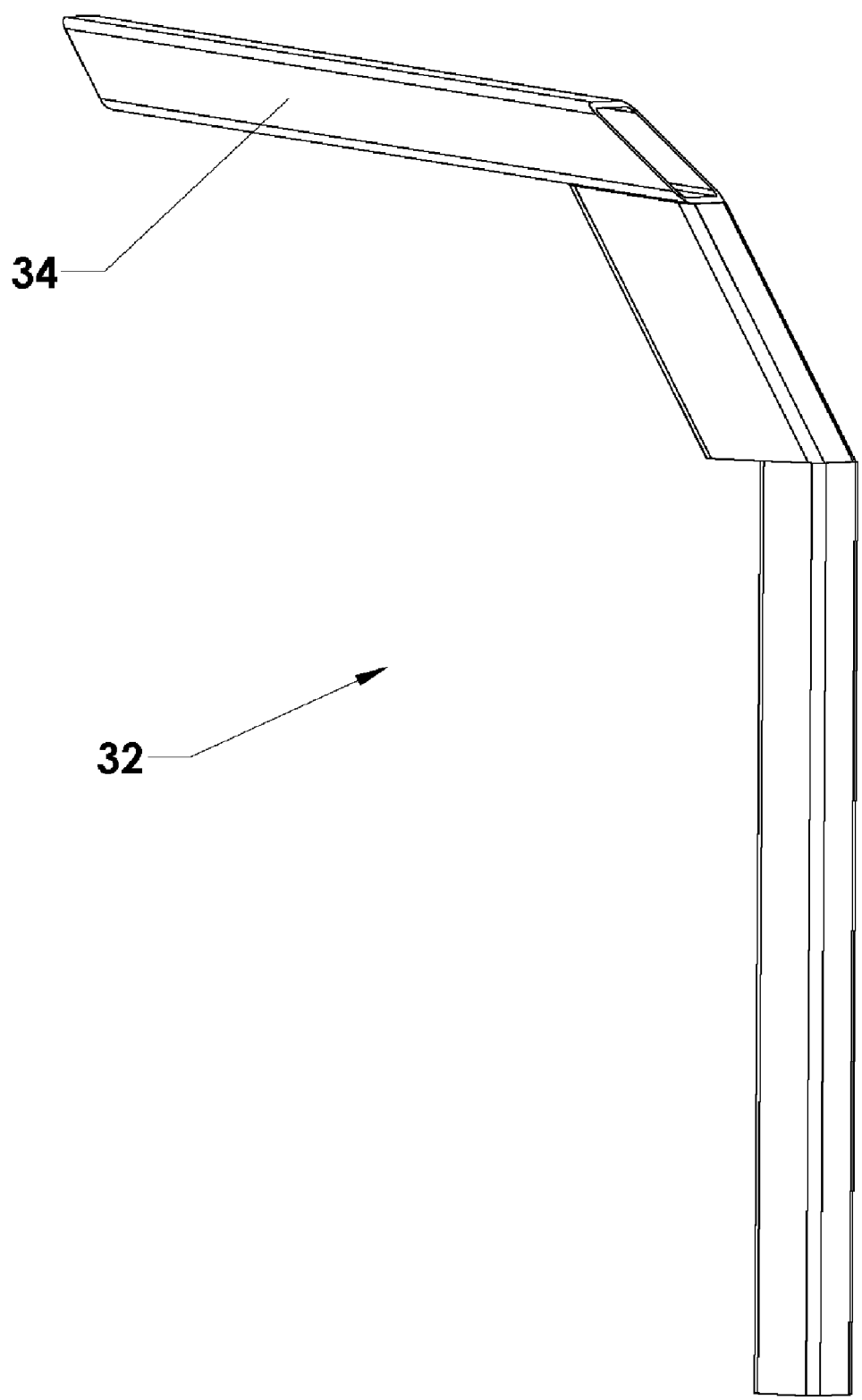
FIG. 4D is a detailed perspective view of the middle fender support used on the carrier frame illustrated in FIG. 4.

The function and design of the middle fender support weldment 32 shown in FIG. 4 and in detail in FIG. 4D is very similar to the rear fender support weldment 31 and only differs in a shorter length upper rectangular tube 34.

Figure 4E:
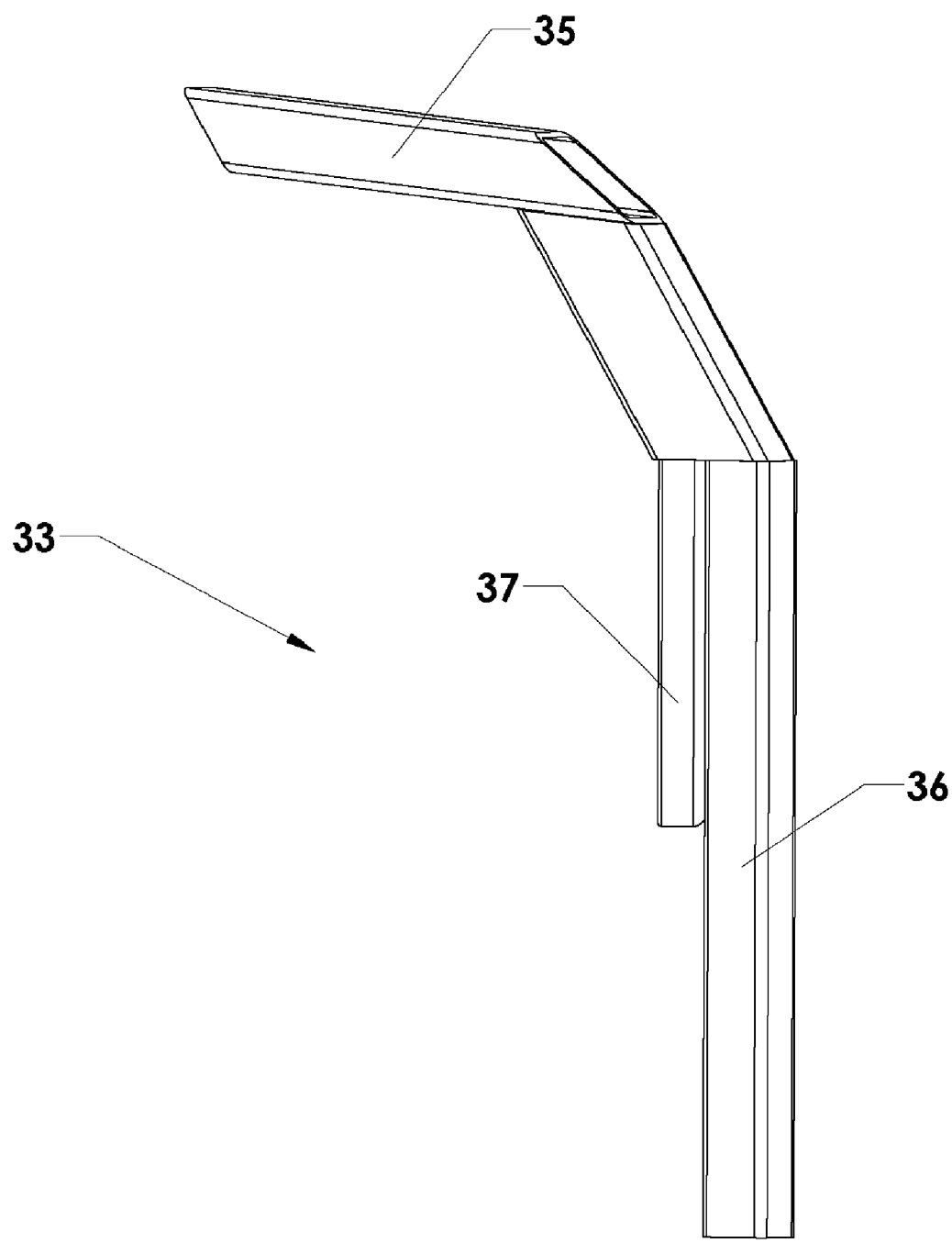
FIG. 4E is a detailed perspective view of the front fender support used on the carrier frame illustrated in FIG. 4.

Similarly, the forward fender support weldment 33 shown in FIG. 4. and in detail in FIG. 4E is also comparable in design and function to the rear fender support weldment 31. Specifically, referring to FIG. 4E, the top rectangular tube 35 and the vertical rectangular tube 36 are shorter than the matching components shown in the rear fender support weldment 31 of FIG. 4C and the middle fender support weldment 32 of FIG. 4D. Referring back to FIG. 4 and FIG. 4E the forward fender support 33 also has an additional vertical rectangular tube 37 that interfaces with the slanted rectangular tube of the sidewall brace weldment 30.

Figure 4F:
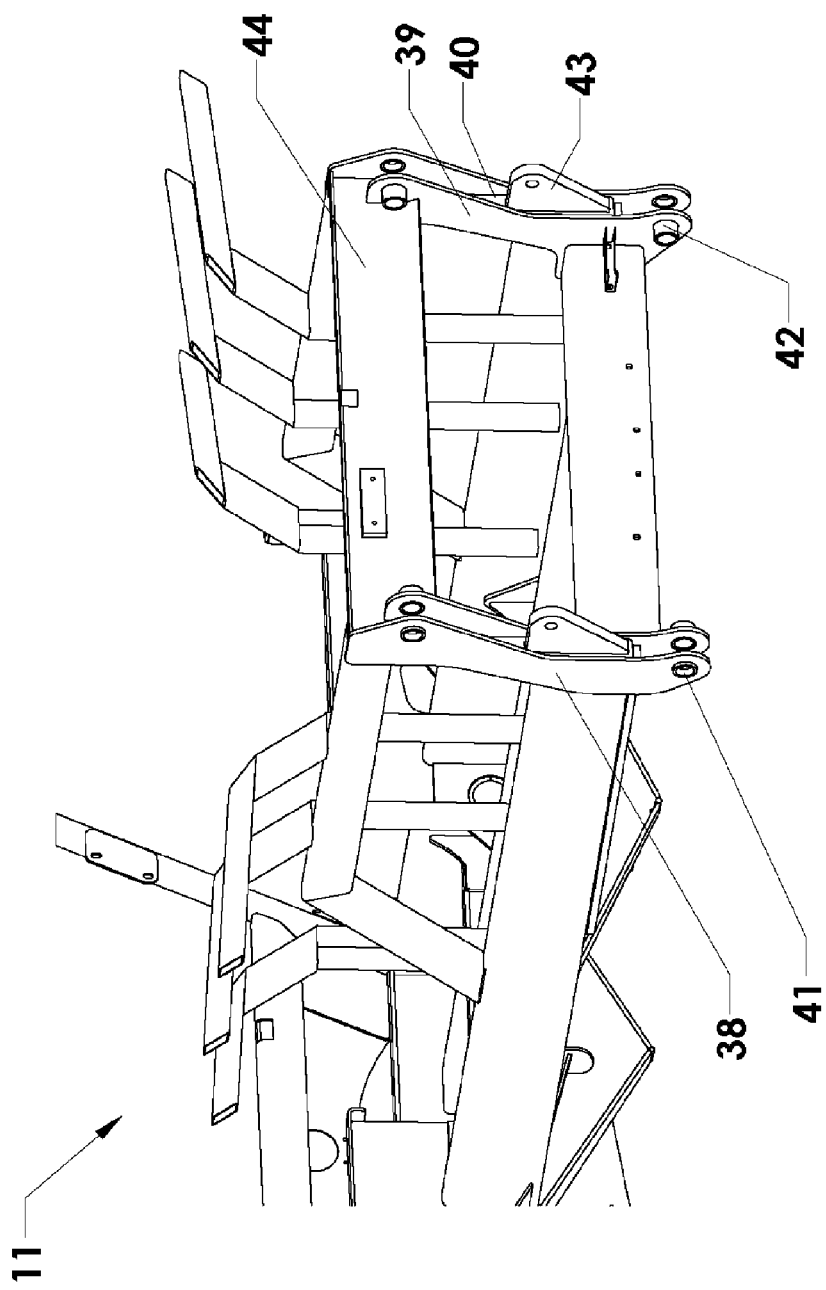
FIG. 4F is a partial rear perspective view of the carrier frame used with the configuration of FIG. 1.

Referring now to FIG. 4F, the outside vertical link plates 38, the inside vertical link plates 39, and the interior spacer plate 40 provide the support for the rear portion of the sidewall brace weldment 30 as well as location holes for attaching the parallel linkage that supports the chemical application boom 4. The outside vertical link plates 38 and the inside vertical link plates 39 are separated sufficiently by the interior spacer plate 40 so as to allow clearance for the parallel link assembly to be pinned between them. A short D.O.M. bushing 41 is welded in the center of the top and bottom hole locations of the outside vertical link plates 38 and a long D.O.M. bushing 42 is welded in the center of the top and bottom hole locations of the inside vertical link plates 39. The short D.O.M. bushings 41 and the long D.O.M. bushings 42 provide an appropriate bearing surface for the pin securing the parallel linkage assembly.

Referring still to FIG. 4F, a cylinder lug 43 is centered between the outside vertical side plate 38 and the inside vertical side plate 39 in a manner as to secure the base end of the hydraulic actuator that raises and lowers the application boom 4 through the parallel linkage. The hole positions of the outside vertical side plates 38, the inside vertical side plates 39, and the cylinder lug 43 are arranged in a geometry that produces the desired vertical travel for the application boom 4. A formed upper cross member 44 located near the upper portion of the outer vertical side plates 38, the inside vertical side plates 39, and the interior spacer plate 40, boxes these components together laterally and strengthens the carrier frame 11 against the lateral forces of the application boom 4 and the liquid chemical tank 2 at this point.

Preferably the liquid chemical tank 2 and corresponding carrier frame 11 provides a trailer sprayer assembly that is not inhibited from obtaining a 62½ inch (1.59 meters) on-center lateral dimension between the single wheel assemblies 7. This 62½ inch (1.59 meters) distance allows the trailer sprayer assembly 1 to follow the towing vehicle's footprint in row crop applications where the common lateral on-center plant spacing is 30 inches (0.76 meters) and the wheel assemblies of the towing vehicle and trailer sprayer straddle three rows. FIG. 4F shows, the carrier frame 11 components located near the wheel assembly cavity including, but not necessarily limited to, the longitudinal rectangular side tubes 12, the sliding axle plates 27, the sidewall brace weldments 30, the rear fender support weldments 31, the middle fender support weldments 32, the front fender support weldments 33, the outside vertical side plates 38, and the short D.O.M bushings 41 are configured so as not to interfere with the wheel assemblies desired 62½ inch lateral on-center dimension.

Referring again to FIG. 4, a formed platform weldment 46 is located near the front of the carrier frame 11 above the hitch weldment 45. The purpose of the formed platform weldment 46 is to partially constrain the rinse tank 5 with the integrated platform and provide a base for the left ladder mount 47 and right ladder mount 48.

Figure 4G:
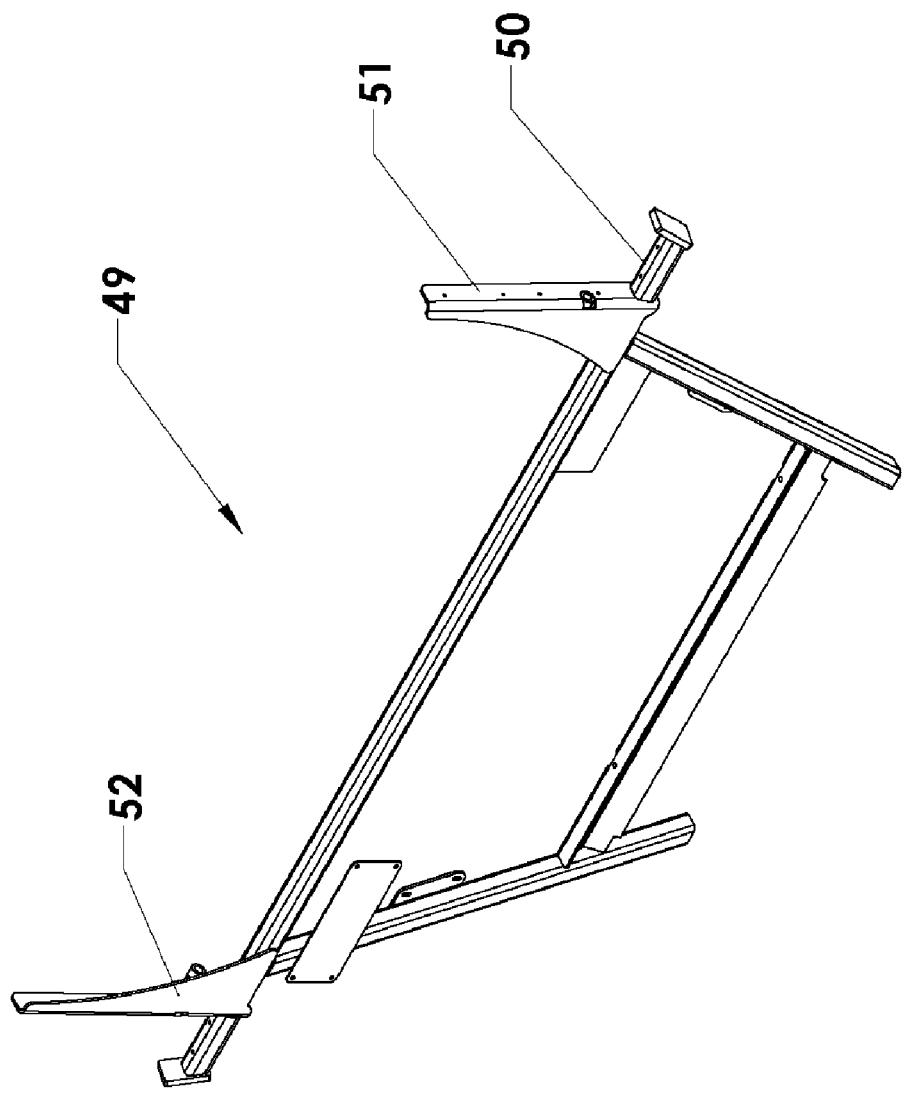
FIG. 4G is a detailed perspective view of the transport rack used on the carrier frame illustrated in FIG. 1.

A transport rack weldment 49, shown in FIG. 4 and in further detail in FIG. 4G, located behind the formed platform weldment 46 and protruding up from the carrier frame 11 provides the framework necessary for supporting the chemical application booms 4 when in the folded transport position. Referring to FIG. 4G, the height of the transport rack's upper wing rest tube 50 is such that when the application boom assembly is in the fully raised position the wings of the boom can rest on the wing rest tube 50 and not interfere with the tire assembly 7 if positioned in a lateral spacing wider than 62½ inches (1.59 meters). The left wing rest stop 51 and the right wing rest stop 52 are positioned near the top of the transport rack weldment and provide a lateral stop member for the application boom 4 to hit against when folding into the transport position. The left wing rest stop 51 and the right wing rest stop 52 are located at distance apart so that the front of folded application boom 4 angles in towards the tank for better transport visibility as illustrated in FIG. 2B.

Referring now to FIG. 6, the approximately 1800 gallon plastic liquid chemical tank 2 as viewed from the top plan view has a symmetric wedge shape side wall profile 60 that is narrower in front and tapers to a wider dimension towards the rear of the tank. A rounded semispheric front head profile 61 and rounded semispheric back head profile 62 contributes to the structural integrity of the tank ends which is necessary due to the hydrostatic pressure and dynamic surging forces of the liquid. The tank's top fill port 63 is laterally centered on the crown 82 of the tank and longitudinally positioned near the forward edge. The forward location of the top fill port 63 allows it to be easily accessed from the operator's platform for top loading chemicals or additives. Projecting from the top fill port 63 and extending to the back head profile 62 is a raised roof ridgeline 81. This raised roof ridgeline 81 is elevated slightly above the crown 82 of the tank and enhances the structural integrity of the crown 82. Also shown in FIG. 6 are the upper baffle indentations 64 located behind the top fill port 63. The upper baffle indentations 64 create a protrusion on the inside of the tank's crown 82 for locating and securing the top of the internal baffle assembly described herein.

FIG. 7 shows lower baffle indentations 65 are positioned in the lower radiused portion of the liquid chemical tank 2 and create an internal protrusion similar to the upper baffle indentations 64 for locating and securing the lower section of the internal baffle assembly.

Figure 8:
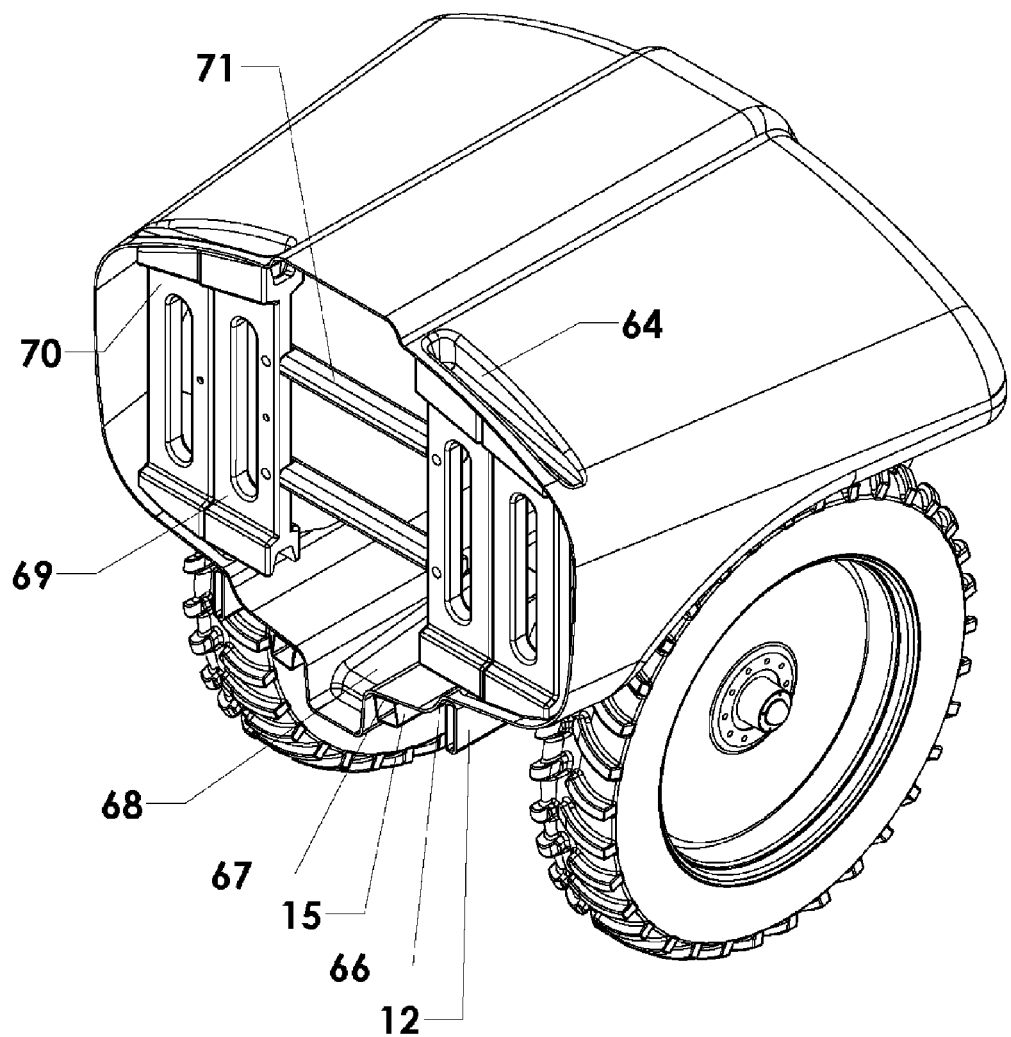
FIG. 8 is a cross-sectional view of the liquid chemical tank and carrier frame illustrating the interior baffle components and carrier frame and tank support features.

Referring to FIG. 7 and FIG. 8, the baffle assembly consists of two inboard panels 69 and two outboard panels 70 separated by two struts 71. The purpose of the baffle assembly in the liquid chemical tank 2 is to diminish the dynamic longitudinal liquid surging that is generally present when the tank is less than completely full. The baffle assembly is designed so that the inboard panels 69 and outboard panels 70 slide into place engaging the lower baffle indentations 65 and the upper baffle indentation 64 from the center of the liquid chemical tank 2. Once in position they are secured from sliding back to the center of the tank by bolting the strut members 71 between the two inboard panels 69.

Also shown in FIG. 7 and in further detail in FIG. 8, the dropped bottom 66 of the tank fits snugly between the two longitudinal rectangular side tubes 12 and the sloped bottom 67 adjacent to the sump trough 68 is well supported by the tipped longitudinal square tubing members 15.

Now referring to FIG. 4 and FIG. 7, the forward flat base 72 of the liquid chemical tank 2 provides a flat surface to carry the front of the tank on the intermediate cross member 16 and formed channel members 17 on the carrier frame 11. As its name implies, the rear flat base 73 is located at the back of the liquid chemical tank 2 and similar to the forward flat base 72 provides a flat surface to support the back of the tank on the lower rear cross member 14 of the carrier frame assembly 11.

Referring still to FIG. 4 and FIG. 7, two large tank stabilizer indentations 77 are symmetrically placed in the front half of tank 2. The outside upper surface of these indentations is designed to rest on the top flange of the formed tank stabilizer arm 18. This stabilizer configuration supports the lower portion of the tank in this area and also provides the framework to stabilize the tank both laterally and vertically.

Referring now to FIG. 3 and FIG. 7, located directly above the stabilizer indentations 77 are the tank hold down pockets 78. These pockets provide a recessed flat surface into the side of the tank for the UHMW hold down tab 10 to secure the liquid chemical tank 2 to the carrier frame 11.

Referring to FIG. 7 the sump trough 68 is laterally centered in the floor of the tank and runs longitudinally along most of the tank between the forward flat base 72 and the rear flat base 73. The bottom of the sump trough has two inclined surfaces; a forward incline 74 and a rear incline 75 that slope towards the front of the tank to flow the tank's liquid into the sump well 76, the lowest portion of the tank, where the liquid is pulled from. The rear incline's 75 shallower sloping angle is required to avoid interference with the receivable axle housing 28, shown in FIG. 5, when located in the furthest forward position. Referring again to FIG. 7, the sump well 76 is the lowest portion of the tank and all surfaces, protrusions, and indentations of the tank are designed to allow liquid from anywhere in the tank to drain to this lower protrusion. A flat surface on the bottom of the sump well 76 allows drain fittings to be installed in this area. The sump well 76 is longitudinally located slightly back from the top fill port 63 so that if high density product is added through the top fill port 63 it does not immediately sink into the sump well 76 and get pulled from the tank.

Figure 9:
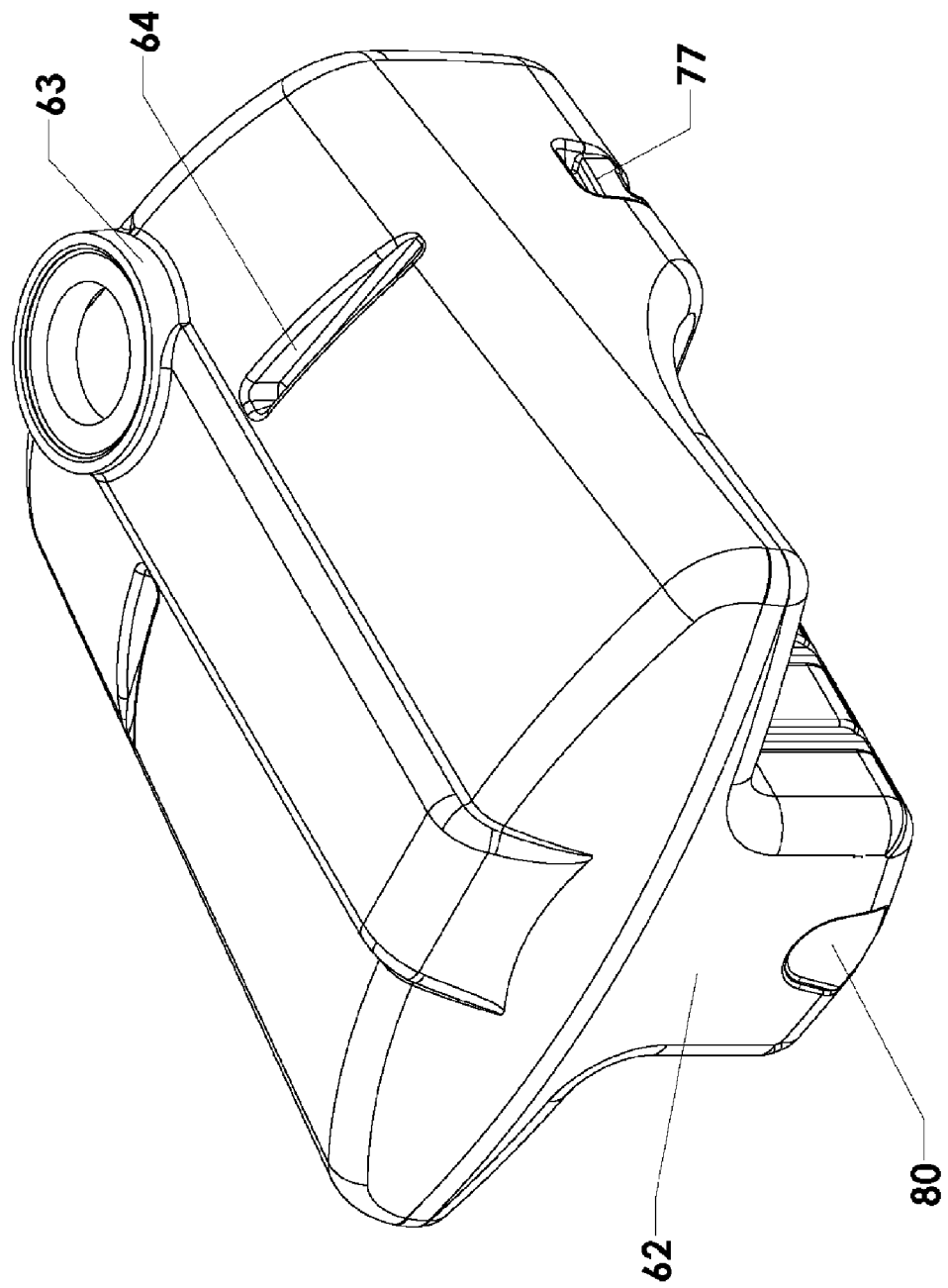
FIG. 9 is a perspective rear perspective view of the liquid chemical tank illustrated in FIG. 1.
Figure 10:
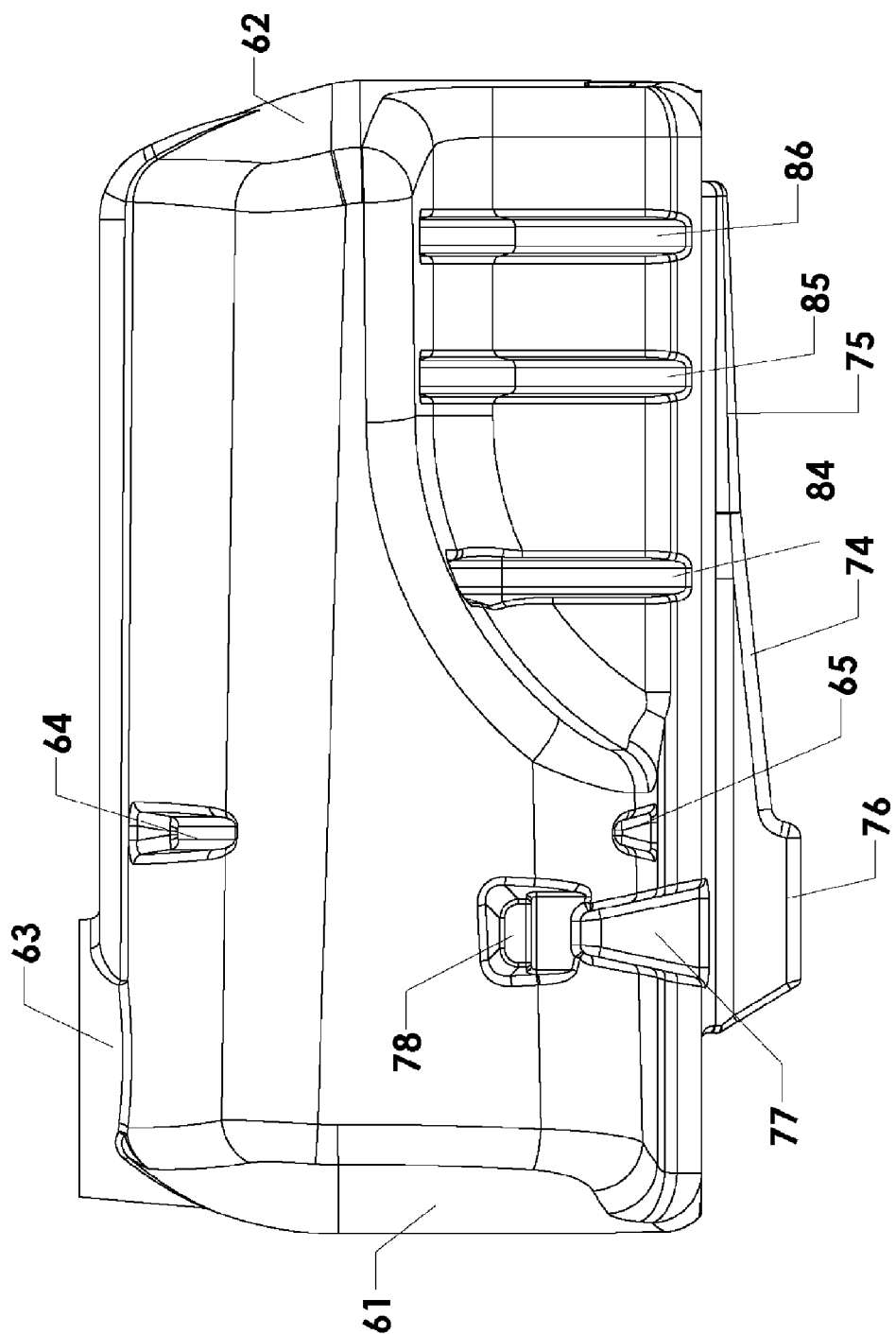
FIG. 10 is a left side plan view of the liquid chemical tank illustrated in FIG. 1.

Referring to FIG. 1, FIG. 7, and FIG. 9, a front sparger tube recess 79 is located near the bottom front of the tank and a rear sparger tube recess 80 is located near the bottom rear of tank 2. These two surfaces provide a flat area in the front head profile 61 and the rear head profile 62 near the lower portion of the tank 2 so threaded fittings can be installed to secure a full length agitation or sparger tube longitudinally through the length of the tank 2. In the embodiment presented, the sprayer assembly liquid is intended to be supplied to the front of the sparger tube and the back of the tube capped. For this reason the front sparger tube recess 79 is significantly deeper than the rear sparger tube recess 80 so various pipe fittings can be secured to the sparger tube and not interfere with the rinse tank 5 located in close proximity to the front of the liquid chemical tank 2.

Referring now to FIG. 5 and FIG. 7, wheel wells 83 are recessed into the rear portion of the tank to create a cavity for the wheel assembly 7 to reside when positioned in the minimum 62½ inch (1.59 meters) on-center lateral dimension. The wheel well 83 must also accommodate the wheel assemblies 7 longitudinal position whether placed in the forward, middle or back position relative to the hitch point. A forward rib 84, a middle rib 85 and a back rib 86 recess are incorporated to enhance the rigidity of the tank's side walls and upper portion of the deep recessed wheel well. While the ribs alone contribute to the structural integrity of the wheel well cavity, they are also designed to encompass the front fender support 33, middle fender support 32 and rear fender support 31 weldments of the carrier frame 11.

Obviously, many modifications and variations of the present invention are possible in light of the above teachings. It is therefore understood that, within the scope of the appended claims, the invention may be practiced otherwise than as specifically described.

What is claimed is:

1. A liquid chemical applicator tank comprising,
   a rounded front head profile of a first width,
   a semispheric back head profile of a second width, larger than the first width,
   a wedge shaped side wall profile from the front to the back of the tank,
   the back end of the tank having, a left and a right side concave wheel well with ribs formed as indentations in portions of the vertical and horizontal walls,
   a longitudinal sloped bottom portion having a width and sides centered between the wheel wells,
   left and right side stabilizer indentations in the base of the tank between front of the tank and the wheel well, symmetrically placed on each side of bottom portion of the tank,
   a hold down pocket above the stabilizer indentations, and
   a top fill port between front end of the tank and the stabilizer indentations.

2. A liquid chemical applicator tank as in claim 1 having,
   a lower and upper baffle indentations between the wheel well and the stabilizer indentations, and
   inboard panels inside the tank extending from the lower to the upper baffle indentations.

3. A liquid chemical applicator tank as in claim 1 having,
   a sump well at the bottom of the longitudinal sloped bottom portion.

4. A liquid chemical applicator tank as in claim 1 having,
   a trailer having a rectangular frame and support weldments extending upward and laterally outward from the rear portion of the frame for insertion into the tank ribs to support the tank over the wheel wells.

5. A liquid chemical applicator tank as in claim 4 having,
   channel members running lengthwise inside the frame on each side of the center of the frame for supporting the tank and allowing the longitudinal sloped bottom portion of the tank to extend downward between the channel members.

6. A liquid chemical applicator tank as in claim 4 having,
   a lower and upper baffle indentations between the wheel well and the stabilizer indentations,
   inboard panels inside the tank extending from the lower to the upper baffle indentations.

7. A liquid chemical applicator tank as in claim 6 having,
   tank stabilizer arms on each side of the frame with hold down tabs attached for engaging the hold down pockets on the tank, the stabilizer arms engaging the stabilizer indentations in the base of the tank.

8. A liquid chemical applicator tank as in claim 7 having,
   channel members running lengthwise inside the frame on each side of the center of the frame for supporting the tank and allowing the longitudinal sloped bottom portion of the tank to extend downward between the channel members.

* * * * *